Feb. 3, 1953 R. C. WRIGHT 2,627,238
FUEL AND AIR CONTROL FOR INDUSTRIAL STOKER DRIVES
Original Filed April 28, 1947 3 Sheets-Sheet 1

INVENTOR
R.C. Wright
BY
Mark Richardson
AGENT

Feb. 3, 1953 R. C. WRIGHT 2,627,238
FUEL AND AIR CONTROL FOR INDUSTRIAL STOKER DRIVES
Original Filed April 28, 1947 3 Sheets-Sheet 2

INVENTOR
R. C. Wright

BY Mark Richardson

AGENT

Feb. 3, 1953 R. C. WRIGHT 2,627,238
FUEL AND AIR CONTROL FOR INDUSTRIAL STOKER DRIVES
Original Filed April 28, 1947 3 Sheets-Sheet 3

INVENTOR
R. C. Wright

BY
AGENT

Patented Feb. 3, 1953

2,627,238

UNITED STATES PATENT OFFICE 2,627,238

FUEL AND AIR CONTROL FOR INDUSTRIAL STOKER DRIVES

Richard C. Wright, Bay Village, Ohio, assignor to Iron Fireman Manufacturing Company, Cleveland, Ohio Original application April 28, 1947, Serial No. 744,392. Divided and this application January 19, 1949, Serial No. 71,661

5 Claims. (Cl. 110—101)

This is a divisional application of Serial No. 744,392, filed April 28, 1947, and now U. S. Patent No. 2,578,650, issued December 11, 1951.

This invention relates generally to industrial stoker drives and particularly to a fuel and air feed control for industrial stoker drives.

This invention has for its object the improvements in industrial stoker drives herein set forth, which among other things include an improved planetary type differential speed reducer of the V-belt controlled continuously variable type, the general type of which is set forth in the well-known French patent to M. Henri Mollard, Patent No. 804,694, issued October 29, 1936.

More particularly, my invention provides an improved industrial stoker drive comprising in combination an improved planetary differential type speed reducer, an improved V-belt and expanding sheaves control therefor and an improved means for synchronously controlling the combustion fuel and air, thus providing a novel unitary mechanism of great utility which has previously been lacking in this field.

It should be understood that a stoker drive gear set is for the purpose of reducing the high rotating speed of the electric motor used to drive it to the very low speed (say of the range of 0 to 20 R. P. M.) required to operate the coal feeding screw of the stoker. When a stoker transmission having one or more definite speeds available is used, settings of the damper for control of combustion air can be established so that whenever the fuel feed is changed manually or otherwise, the companion air setting can be made manually or otherwise. But with a continuously variable fuel feed transmission as shown herewith it is desirable to provide a continuously variable air supply control to operate in synchronism with it. Providing such a continuously variable air control and combining it with the fuel control for synchronous variation is another desirable object of this invention.

These and other objects are accomplished in the manner set forth in the following specifications, as illustrated in the accompanying drawings, wherein.

Figure 1:
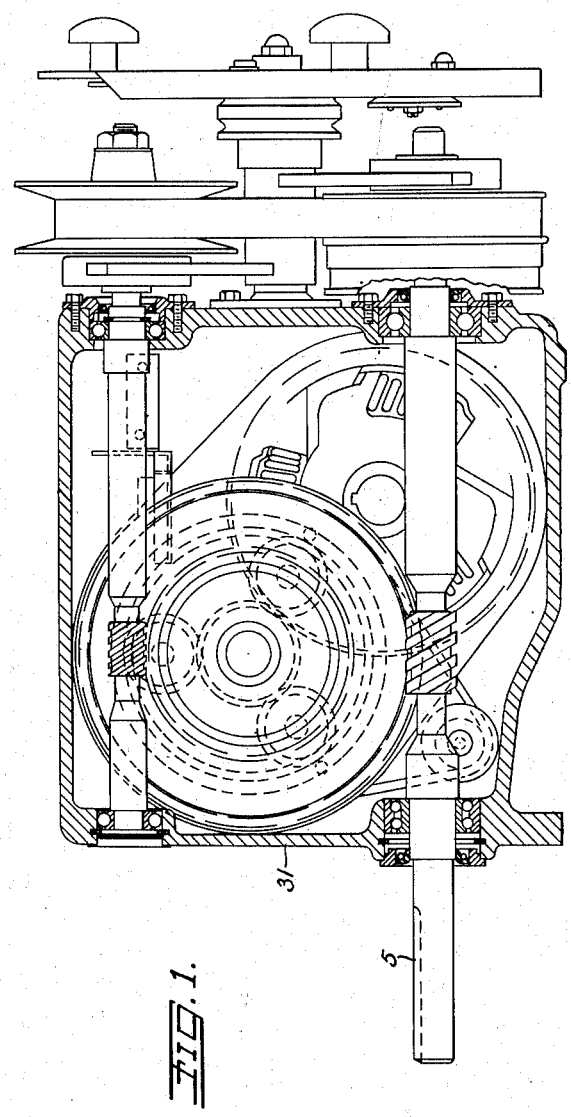
Fig. 1 is a part sectional side view of my transmission.
Figure 2:
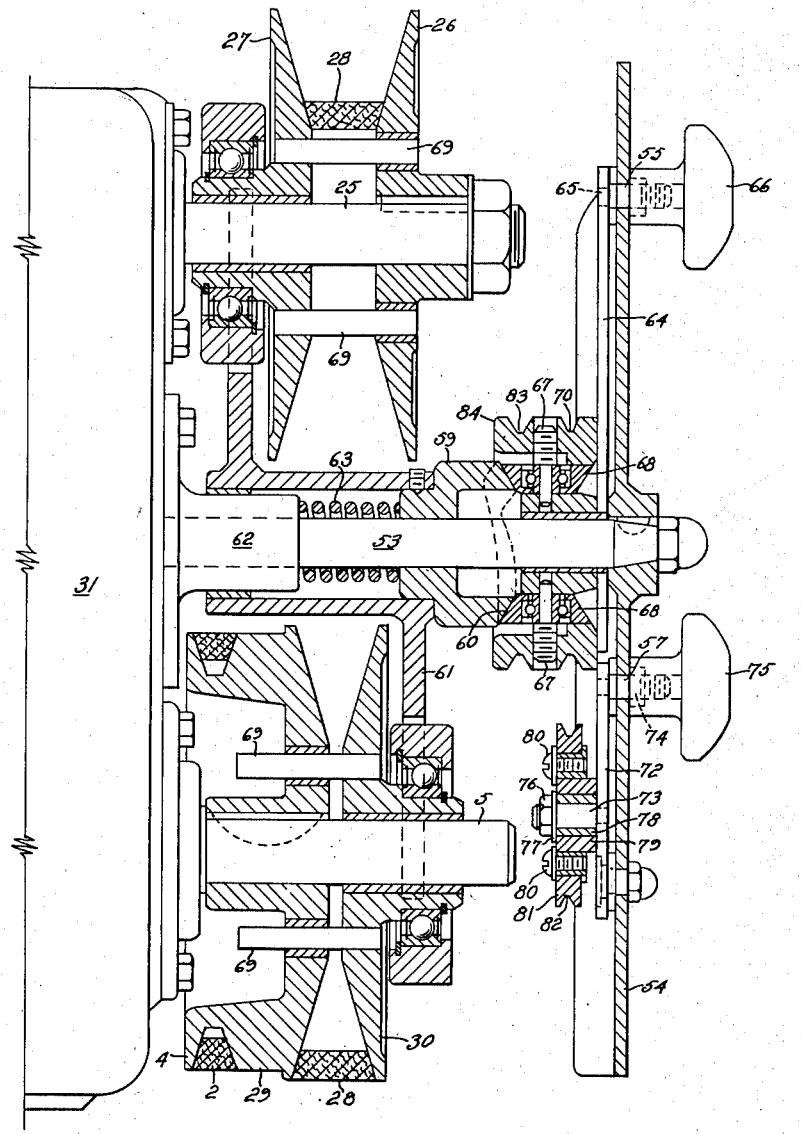
Fig. 2 is a sectional view of my V-belt and expanding sheave control shown in side elevation on the right end of Fig. 1.

Referring now to the drawings, at 1 is shown an electric motor assumed to be connected to a power line (not shown) through a magnetic switch (not shown). By means of V-belt 2 and sheaves 3 and 4, motor 1 drives the input shaft 5 on which is fixed worm 6 mating with worm gear 7 carried on differential ring gear 8 meshing with planet gears 9 rotatably supported on pins 10 fixed in planet cage 11—12 to which is fixed concentric pinion 13 which meshes with gear 14 keyed to shaft 16, to which is pinned chain sprocket 17 which drives chain sprocket 18 through roller chain 19. Sprocket 18 is secured to the feed screw 20 of the stoker coal feeding conveyor (not shown).

Sun pinion 21 keyed to shaft 22 rotates with worm gear 23 keyed to shaft 22. Worm gear 23 meshes with worm 24 on shaft 25 to which is secured the fixed half 26 and on which slides the movable half 27 of an expanding sheave coupled through V-belt 28 to another expanding sheave whose fixed half 29 is secured to shaft 5 and whose movable half 30 slides on shaft 5.

Shafts 5, 16, 22 and 25 are carried on bearings in the housing 31 as shown. Ring gear 8 and planet cage 11—12 are rotatably carried on shaft 22 as shown.

Rigidly secured to case 31 and parallel with shafts 5 and 25 is dead shaft 53 to which is rigidly secured at its outer end indicator plate 54 having at its upper end arcuate slot 55 and scale 56 to indicate the relative speed of the output shaft of the transmission in terms of whatever use to which the transmission is put—in this the coal feed of the stoker. Below the center of indicator plate 54 it is perforated by arcuate slot 57 and carries scale 58 for indicating and adjusting the air-fuel ratio of the stoker in a manner to be described.

Figure 3:
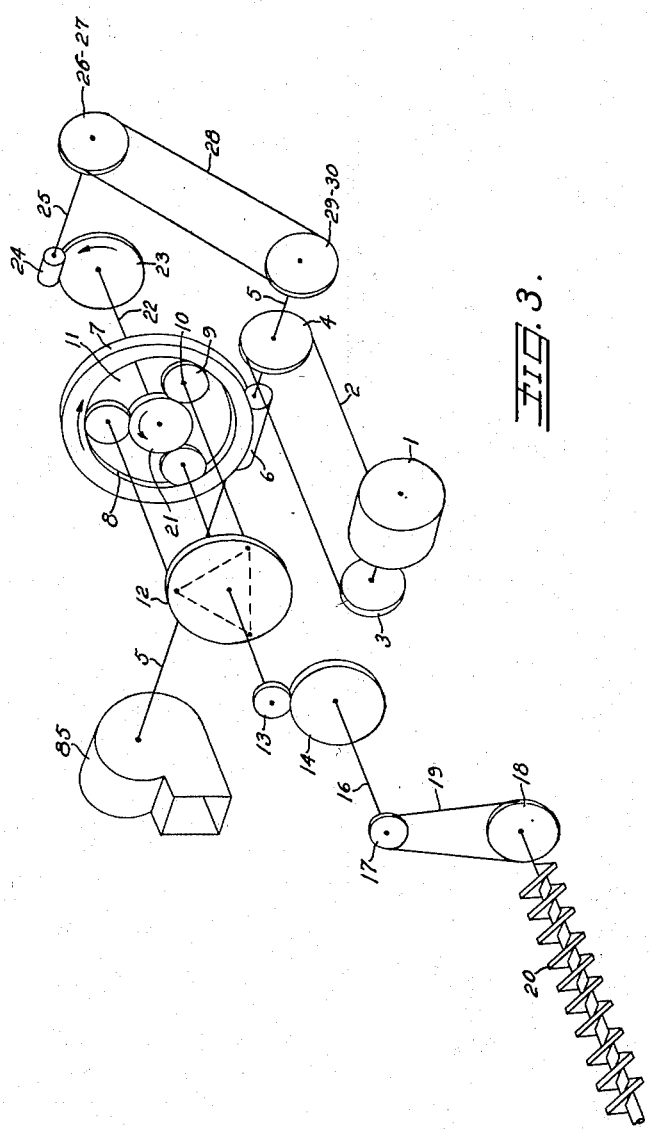
Fig. 3 is a skeletonized view in perspective showing the mechanical scheme of my fuel feeding transmission.

Axially slidable on dead shaft 53 is hub 59 having cam face 60 and carrying Z frame 61 also guided on hub 62 of case 31. Around shaft 53 and abutting hubs 59 and 62 is compression spring 63 continuously urging Z frame and cam away from case 31. Journalled on shaft 53 is two-groove sheave 84 restrained in both axial and angular movement by lever arm 64 one end of which is journalled on shaft 53 and whose other end carries stud 65 extending through slot 55 in plate 54 to which arm 64 may be clamped by knob 66 threaded on stud 65. Rotatably carried on studs 67 in sheaves 84 are two diametrically opposed conical cam followers 68 which, by the angular position of sheaves 84 or arm 64, determine the axial position of Z frame 61. The ends of Z frame 61 are secured respectively to the outer races of ball bearings whose inner races are secured as shown to the hubs of movable half sheaves 27 and 30. Movable half sheaves 27 and 30 rigidly support pins 69 which slidably engage fixed half sheaves 26 and 29 causing movable half sheaves 27 and 30 to maintain constant angular relations with their respective fixed half sheaves 26 and 29.

Where a stoker supplies coal to a combustion chamber, air must also be supplied at a rate synchronized with the coal feed rate and the air supply may be through a fan driven separately from the coal feed drive or the fan 85 may be connected directly to the coal feed drive through shaft 5 as indicated in Fig. 3. In this case, as shown in Fig. 1, both ends of shaft 5 extend to the outside of case 31, one end carrying drive and regulating sheaves and the other end carrying the fan wheel. But whenever the source of combustion air, the control will preferably be by an automatic air regulating damper mechanism of the type developed along the lines of U. S. Patents 2,116,912, 2,108,873 and 2,149,934. In these patents, it is shown that any desired rate of air feed for which the control is set will be strictly maintained and that the rate of air fed may be smoothly varied simply by varying the setting of the air rate indicating quadrant or lever of the air control. To synchronize such an air control with my present stoker drive, the setting arm or quadrant of the air control is biased by means of a spring or weight towards its less air limit and a tiller rope or cable is attached to the quadrant to move it against the force of the spring. This tiller rope or cable, guided by the necessary idler sheaves, is brought from the air control quadrant and approaches the transmission in the plane of groove 70 in sheaves 84.

Hinged on plate 54 by journal 71 is air adjustment lever arm 72 carrying stud 73 intermediate its ends and stud 74 at its upper end. Stud 74 extends through slot 57 in plate 54. Knob 75 threaded on stud 74 clamps arm 72 in any desired angular position. Nut 76 and washer 77 clamp bushings 78 securely against arm 72. Rotatably mounted on bushing 78 is eccentric bushing 79. Adjustably secured by screws 80 to eccentric bushing 79 is eccentric rim 81 on the circular periphery of which is formed sheave groove 82 in the plane of groove 70 of sheave 84. Eccentric 79 and eccentric 81 have the same maximum eccentricity so that by relative adjustment of these two parts groove 82 may be concentric with stud 73 or can have an eccentricity thereto equal to the sum of the eccentricities of parts 79 and 81.

The tiller rope leading from the air damper control adjustment quadrant is led around under rim 81 in groove 82 and after wrapping partially around sheave 84 in groove 70 is secured to sheave 84 in such a manner that when sheave 84 is rotated the tiller cable wraps or unwraps respectively and thus adjusts the air control synchronously with the coal feed control. As the tiller rope moves with the rotation of sheave 84, it rotates eccentric idler rim 81 which is adjusted to compensate for the adjustment characteristic of the air control in order that true synchronism is established between the coal feed control and the air control when airm 72 is at the central or "normal" air ratio position of scale 58 on plate 54. Knob 75 is used to bias the air feed rate against the coal feed rate for various reasons found in the practical operation of industrial stokers.

It is thus seen that the coal feed and air feed can be simultaneously varied while maintaining the desired fuel-air ratio by manually loosening knob 66 and moving lever arm 64 in the desired direction as indicated on the scale.

It is obviously not likely that either the coal feed adjustment through lever arm 64, cam followers 68, cam 60 and sheaves 26—27, 29—30, with belt 28 will have a straight line characteristic nor that the air feed adjustment such as shown in Patents 2,116,912, 2,108,873 and 2,149,934 above referred to as connected through a tiller rope to the present invention will have a straight line characteristic matching in a desired ratio the coal feed adjustment. It is therefore desirable to have available the sheave 79—81 of adjustable eccentricity to adjust within practical limits the air feed control characteristic.

Should it be found in operation that the fuel bed in the furnace gradually builds up or burns down this difficulty can be corrected by loosening knob 75 and manually adjusting lever arm 72 to take up or slacken the air feed adjustment tiller rope connection above referred to and thereby change the fuel-air ratio over the entire range of the control. This latter adjustment is also very valuable when it is desired to quickly change the depth of fuel bed in the furnace without disturbing the parallelism of the fuel and air adjustments as established by the adjustment of eccentric sheave 79—81.

From the above description of the operation of my device, it is seen that I have provided a means (cam face 60 and cam followers 68) for varying the ratio of the sheave diameters of the V-belt drive to vary the output shaft speed of the speed changer and thereby vary the rate of coal feed to the furnace, a means (arm 15 of U. S. Patent 2,116,912 or plate 45 of U. S. Patent 2,108,873 or arm 43 of U. S. Patent 2,149,934) for varying the rate of combustion air feed to the furnace, a means (the tiller rope and sheave 84) for connecting said sheave diameter varying means and said rate of combustion air feed varying means for simultaneous operation, a means (lever arm 64) for variably positioning said connecting means and a means (eccentric sheave 79—81) for adjusting said air rate varying means, whereby a change in the position of said connecting means will not substantially change the ratio of fuel to combustion air feed to said furnace.

Groove 83 of sheave 84 is provided for remote control by tiller rope of coal feed and air feed synchronously. When this means of remote control is used, knob 66 is either left in a loosened condition or removed entirely.

Having thus fully described the mechanism by means of which I have attained the previously stated objects of my invention, it is clear that many variations of the shown constructions are feasible. Therefore, I do not intend to be limited by the constructions shown but desire to preserve the full scope of my invention and

I claim:

1. In a coal stoker having means for feeding coal to a furnace, means for feeding combustion air to said furnace, means for driving said coal feeding means, and means for driving said air feeding means, the combination of a continuously variable speed transmission interposed between said coal feeding means and its said driving means, a continuously variable means for varying the rate of air feed to said furnace, means for simultaneously varying in increments of any required size the rate of coal feed and the rate of air feed to said furnace, and means for adjusting said rate varying means whereby a change in coal feed rate will be accompanied by a change in air feed rate without substantially altering the ratio of fuel and air fed to said furnace, said last mentioned means including an idler sheave carried on an adjustably positioned lever arm, said idler sheave comprising an eccentric hub member and an eccentric rim member adjustably secured thereto, each of said members being circular at both its inner and outer diameters and the inner diameter of each of said members being of a circle eccentric with respect to the circle of its outer diameter.

2. In a coal stoker having means for feeding coal to a furnace, means for feeding combustion air to said furnace, means for driving said coal feeding means and means for controlling the rate of combustion air feed to said furnace, the combination of a speed changing power transmission means interposed between said coal feeding means and said means for driving said coal feeding means, said speed changing means comprising two parallel spaced rotatable shafts with a variable sheave diameter V-belt connection between said two shafts, a fixed shaft, means axially slidable on said shaft adapted to vary the ratio of the working diameters of said sheaves, said axially slidable means having a cam face thereon, an axially fixed cam follower means rotatably mounted on said shaft, said cam follower means being adapted to cooperate with said cam face to vary the axial position of said axially slidable means as the angular position of said cam follower means is varied, means adapting said cam follower means to be angularly positioned in response to a requirement, and means adapting said cam follower means to position said air feed rate controlling means as the angular position of said cam follower means is varied, together with means for adjusting said positioning means for said air feed rate controlling means whereby a change in coal feed rate will be accompanied by a change in air feed rate without substantially altering the ratio of fuel feed and air feed to said furnace, said adjusting means for said positioning means comprising a second non-rotatable shaft, an eccentrically bored hub rotatably carried on said non-rotatable shaft and an eccentrically bored rim adjustably positionable on said hub.

3. The mechanism of claim 2 in which said second non-rotatable shaft is carried on an adjustably positioned lever arm.

4. In a coal stoker having means for controlling the rate of coal feed to a furnace and means for controlling the rate of air feed to said furnace, means for simultaneous control of said coal feed and said air feed to maintain a desired coal feed to air feed ratio, together with means for adjusting said ratio, said coal feed rate controlling means comprising a drive shaft, a driven shaft, a V-belt, a V-belt sheave on each of said shafts, each of said sheaves being separable for relative axial movement of its two belt riding cheeks, one of said sheaves having its left hand half fixed to one of said shafts and its right hand half adapted to slide on said one of said shafts, the other of said sheaves having its right hand half fixed to the other of said shafts and its left hand half adapted to slide on said other of said shafts, a third shaft secured parallel to said drive and driven shafts, a frame carried on said third shaft and axially movable therealong, means adapting said frame to control the movement of said movable halves of said sheaves axially of said shafts, means biasing said frame axially of said shafts, adjustable means for opposing said biasing means to position said frame, said adjusting means comprising a cam on said frame, a third sheave rotatably mounted on said third shaft, and a cam follower carried on said sheave, said ratio adjusting means comprising a fourth shaft secured parallel to the other said shafts and an idler sheave rotatably mounted on said fourth shaft, said idler sheave comprising an eccentric hub member and an eccentric rim member adjustably secured thereto, each of said members being circular at both its inner and outer diameters and the inner diameter of each of said members being of a circle eccentric with respect to the circle of its outer diameter, said simultaneous control means comprising a rope partially wrapped on said third sheave and on said idler sheave.

5. In a coal stoker having means for controlling the rate of coal feed to a furnace, means for controlling the rate of air feed to said furnace, means for simultaneous control of said coal feed and said air feed to maintain a desired coal feed to air feed ratio, together with means for adjusting said ratio: said coal feed rate controlling means comprising a variable sheave diameter V-belt drive together with a cam and cam follower means for varying the sheave diameters of said drive, a rotatably mounted cam follower carrier and a rope sheave on said carrier; said means for adjusting said ratio comprising a rotatably mounted idler sheave, said idler sheave comprising an eccentric hub member and an eccentric rim member adjustably secured thereto, each of said members being circular at both its inner and outer diameters and the inner diameter of each of said members being of a circle eccentric with respect to the circle of its outer diameter; and said means for simultaneous control comprising a rope secured at one end to said air feed rate controlling means and secured at its other end to said cam follower carrier, said rope being resiliently biased longitudinally in the direction of its said one end, and said rope being wrapped partially around said idler sheave and partially around said carrier sheave, whereby said simultaneous adjustment is accomplished by rotation of said carrier sheave while said desired coal feed to air feed ratio is maintained by the variation in travel of the two ends of said rope as caused by the eccentricity of said idler sheave.

RICHARD C. WRIGHT.

REFERENCES CITED

The following references are of record in the file of this patent:

UNITED STATES PATENTS

| Number | Name | Date |
| --- | --- | --- |
| 534,448 | McIntyre | Feb. 19, 1895 |
| 1,971,035 | Fulton | Aug. 21, 1934 |
| 1,993,547 | Heyer | Mar. 5, 1935 |
| 2,020,026 | Gilpin | Nov. 5, 1935 |
| 2,315,070 | McNaughton | Mar. 30, 1943 |